United States Patent
Wang et al.

(10) Patent No.: US 8,972,593 B2
(45) Date of Patent: Mar. 3, 2015

(54) LOAD SHARING METHOD, LOAD SHARING SYSTEM AND ACCESS SERVER

(75) Inventors: Lili Wang, Shenzhen (CN); Zhifeng He, Shenzhen (CN)

(73) Assignee: Huawei Technologies Co., Ltd., Shenzhen, P.R. (CN)

( * ) Notice: Subject to any disclaimer, the term of this patent is extended or adjusted under 35 U.S.C. 154(b) by 124 days.

(21) Appl. No.: 13/603,071

(22) Filed: Sep. 4, 2012

(65) Prior Publication Data

US 2012/0331164 A1    Dec. 27, 2012

Related U.S. Application Data

(63) Continuation of application No. PCT/CN2010/078622, filed on Nov. 11, 2010.

(30) Foreign Application Priority Data

Mar. 9, 2010    (CN) .......................... 2010 1 0122097

(51) Int. Cl.
*G06F 15/16* (2006.01)
*H04W 28/08* (2009.01)

(52) U.S. Cl.
CPC .................................... *H04W 28/08* (2013.01)
USPC ................ 709/229; 709/203; 718/105; 726/2

(58) Field of Classification Search
USPC .......... 709/226, 229, 202–203; 718/104–105; 726/2–4
See application file for complete search history.

(56) References Cited

U.S. PATENT DOCUMENTS

| | | | |
|---|---|---|---|
| 6,011,910 A * | 1/2000 | Chau et al. ..................... | 709/229 |
| 6,542,992 B1 * | 4/2003 | Peirce et al. .................. | 709/202 |
| 7,606,916 B1 * | 10/2009 | Potter et al. ................... | 709/229 |
| 2003/0200277 A1 | 10/2003 | Kim | |
| 2004/0264443 A1 | 12/2004 | Beck et al. | |

(Continued)

FOREIGN PATENT DOCUMENTS

| | | |
|---|---|---|
| CN | 1494257 A | 5/2004 |
| CN | 1589558 A | 3/2005 |

(Continued)

OTHER PUBLICATIONS

Copy of Written Opinion of the International Searching Authority issued in corresponding PCT Patent Application No. PCT/CN2010/078622, mailed Feb. 17, 2011.

(Continued)

*Primary Examiner* — Bharat N Barot
(74) *Attorney, Agent, or Firm* — Brinks Gilson & Lione

(57) ABSTRACT

A load sharing method, system, and access server has been disclosed. The load sharing method includes: sending request information to at least two authentication authorization accounting servers, receiving respective state information sent by the at least two authentication authorization accounting servers according to the request information, determining a load sharing ratio among the at least two authentication authorization accounting servers according to the respective state information, and sharing loads among the at least two authentication authorization accounting servers according to the load sharing ratio. The access server can adjust the load sharing ratio among the authentication authorization accounting servers dynamically, which improves user access performance.

9 Claims, 2 Drawing Sheets

(56) References Cited

U.S. PATENT DOCUMENTS

| | | |
|---|---|---|
| 2005/0038891 A1 | 2/2005 | Martin |
| 2009/0083861 A1* | 3/2009 | Jones .............................. 726/29 |
| 2009/0265467 A1 | 10/2009 | Peles |
| 2011/0023092 A1* | 1/2011 | Wen et al. ......................... 726/4 |

FOREIGN PATENT DOCUMENTS

| | | |
|---|---|---|
| CN | 1835453 A | 9/2006 |
| CN | 1856134 A | 11/2006 |
| CN | 101174997 A | 5/2008 |
| EP | 1357720 A1 | 10/2003 |
| WO | WO 03/026244 A2 | 3/2003 |

OTHER PUBLICATIONS

Copy of International Search Report issued in corresponding PCT Patent Application No. PCT/CN2010/078622, mailed Feb. 17, 2011.
Copy of Extended European Search Report issued in corresponding European Patent Application No. 10847286.1, mailed Nov. 26, 2012.
Copy of Office Action issued in corresponding Chinese Patent Application No. 201010122097.5, mailed May 27, 2013, 14 pages.

* cited by examiner

LOAD SHARING METHOD, LOAD SHARING SYSTEM AND ACCESS SERVER

CROSS-REFERENCE TO RELATED APPLICATION

This application is a continuation of International Application No. PCT/CN2010/078622, filed on Nov. 11, 2010, which claims priority to Chinese Patent Application No. 201010122097.5, filed with the Chinese Patent Office on Mar. 9, 2010 and entitled "LOAD SHARING METHOD, SYSTEM, AND ACCESS SERVER", both of which are incorporated herein by reference in their entireties.

FIELD OF THE DISCLOSURE

The present disclosure relates to the field of communication technologies and, in particular, to a load sharing method, system, and access server.

BACKGROUND

With the development of the Internet technology, communication requirements extend from traditional low-speed services such as telephone, fax, and telegram to high-speed broadband services such as Internet access, videophone, and video on demand. Users require higher and higher Internet access rates, and the low-speed Internet access mode of the traditional dialup modem can hardly meet user requirements.

Meanwhile, more and more users access a metropolitan area network, and therefore, the users' service requirements are expanding, and the broadband metropolitan area network has a tendency of developing into a multi-service bearer network. A broadband remote access server (Broadband Remote Access Server, hereinafter BRAS) has flexible access authentication, efficient address management function, and powerful user management function, and can provide rich and flexible service and control functions. Therefore, the BRAS can effectively manage and control users who access the broadband metropolitan area network and services used by the users.

An authentication authorization accounting (Authentication Authorization Accounting, hereinafter AAA) server provides the functions of authentication, authorization, and accounting for the users. The AAA server of the user may be implemented through various protocols, and the most commonly used protocol is Remote Authentication Dial In User Service (Remote Authentication Dial In User Service, hereinafter RADIUS). The RADIUS protocol is an application layer communication protocol between the BRAS and the AAA server, and an AAA server based on the RADIUS protocol is called a RADIUS server.

When there are many BRAS access users, multiple RADIUS servers are generally deployed in the network to share the load. On one side, each RADIUS server can perform authentication, authorization and accounting for any user, and on the other hand, each RADIUS server can perform access authentication for users of multiple BRASs.

In the prior art, the RADIUS load sharing of the BRAS is primarily controlled by configuring command lines. For example, if 2 RADIUS servers are available in the network, a 1:1 ratio may be configured on the BRAS to share the load of functions such as authentication, authorization and accounting for the user.

However, when there are many access users, a RADIUS server may be too busy to respond to the user's authentication requests in time, and the BRAS works at the fixed load sharing ration only, and cannot make adjustment according to the current respective state of the RADIUS server. Consequently, some users fail to access the network due to authentication timeout.

SUMMARY

A load sharing method provided in an embodiment of the present disclosure, includes:
sending request information to at least two authentication authorization accounting servers;
receiving respective state information sent by the at least two authentication authorization accounting servers according to the request information;
determining a load sharing ratio among the at least two authentication authorization accounting servers according to the respective state information; and
sharing loads among the at least two authentication authorization accounting servers according to the load sharing ratio.

An access server provided in embodiment of the present disclosure includes:
a sending module, configured to send request information to at least two authentication authorization accounting servers;
a receiving module, configured to receive respective state information sent by the at least two authentication authorization accounting servers according to the request information;
a determining module, configured to determine a load sharing ratio among the at least two authentication authorization accounting servers according to the respective state information received by the receiving module; and
a load sharing module, configured to share loads among the at least two authentication authorization accounting servers according to the load sharing ratio determined by the determining module.

A load sharing system provided in an embodiment of the present disclosure includes: an access server and at least two authentication authorization accounting servers.

The access server is configured to: send request information to at least two authentication authorization accounting servers, receive respective state information sent by the at least two authentication authorization accounting servers according to the request information, determine a load sharing ratio among the at least two authentication authorization accounting servers according to the respective state information, and share loads among the at least two authentication authorization accounting servers according to the load sharing ratio.

Through the embodiments of the present disclosure, the access server determines a load sharing ratio among at least two authentication authorization accounting servers according to respective state information of the at least two AAA servers, and shares loads among the at least two authentication authorization accounting servers according to the load sharing ratio. In this way, the access server can adjust the load sharing ratio among the authentication authorization accounting servers dynamically, which improves user access performance.

BRIEF DESCRIPTION OF THE DRAWINGS

To better illustrate the technical solution of the present disclosure or the prior art, the following outlines the accompanying drawings used in description of the embodiments of the present disclosure or the prior art. Apparently, the accompanying drawings outlined below are some embodiments of the present disclosure, and persons of ordinary skill in the art can derive other drawings from them without making any creative effort.

DETAILED DESCRIPTION OF THE EMBODIMENTS

To make the objectives, technical solutions and advantages of the embodiments of the present disclosure more comprehensible, the following describes the technical solutions of the present disclosure clearly, thoroughly with reference to accompanying drawings. Evidently, the drawings and the detailed description are merely representative of particular embodiments of the present disclosure rather than all embodiments. All other embodiments, which may be derived by those skilled in the art from the embodiments given herein without any creative effort, shall fall within the protection scope of the present disclosure.

Figure 1:
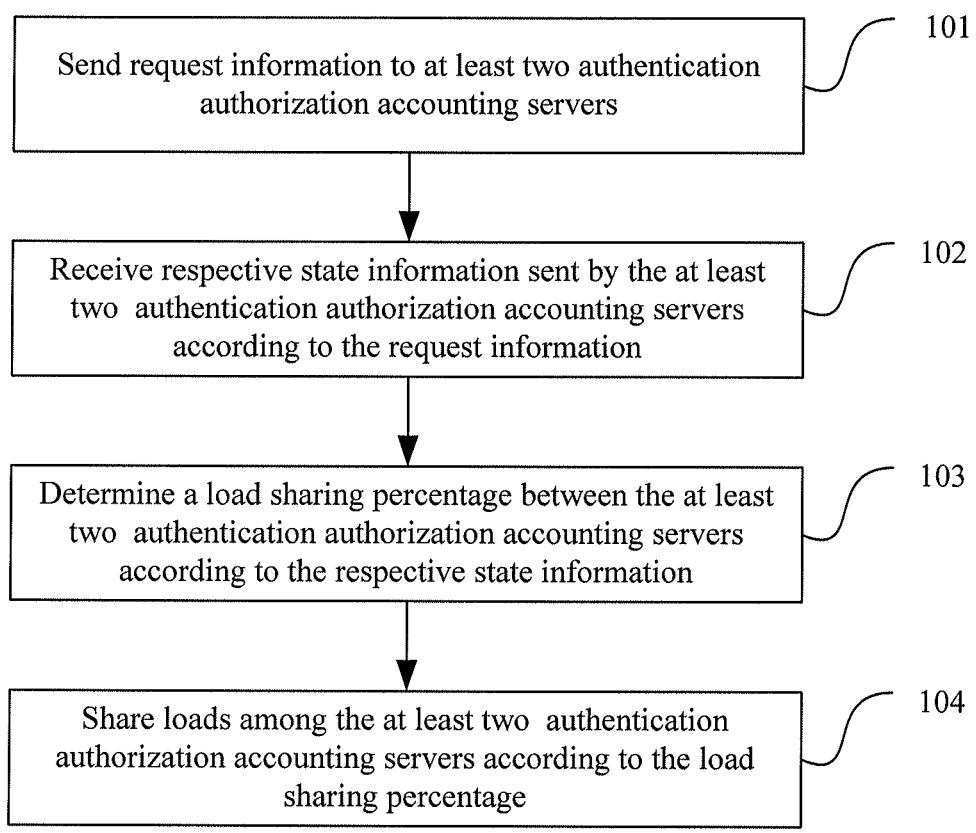
FIG. 1 is a flowchart of a load sharing method according to an embodiment of the present disclosure.

FIG. 1 is a flowchart of a load sharing method according to an embodiment of the present disclosure. As shown in FIG. 1, the load sharing method may include:

Step 101: Send request information to at least two authentication authorization accounting servers.

In this embodiment, the at least two authentication authorization accounting servers may be communicative connected with the access server, and the load sharing ratio among the at least two authentication authorization accounting servers may be preset on the access server. After receiving an access request from the user, the access server sends the user's authentication request message to the at least two authentication authorization accounting servers according to the preset load sharing ratio.

For example, it is assumed that two authentication authorization accounting servers are communicative connected with the access server, and the load sharing ratio among the two authentication authorization accounting servers is preset as 1:1 on the access server. In this case, when receiving access requests from two users, the access server sends one user's authentication request message to one authentication authorization accounting server, and sends the other user's authentication request message to the other authentication authorization accounting server.

In this embodiment, the access server may send request information to at least two authentication authorization accounting servers through authentication request messages. Specifically, the access server may send request information to the at least two authentication authorization accounting servers as triggered by an event; or the access server may send request information to the at least two authentication authorization accounting servers at fixed time or periodically through authentication request messages. Specifically, the access server may preset the period or time of sending request information, or a trigger event. When the preset period expires, or the preset time arrives, or the preset trigger event is triggered, the access server may send an authentication request message that carries a configuration attribute to the at least two authentication authorization accounting servers, where the configuration attribute is the request information for requesting respective state information of the authentication authorization accounting server.

Certainly, the sending mode of the embodiments of the present disclosure is not limited herein, the access server may also send the request information to the authentication authorization accounting servers in other modes. For example, the access server may send a special message that carries the request information to the authentication authorization accounting server. Embodiments of the present disclosure do not restrict the access server's mode of sending the request information.

Step 102: Receive respective state information sent by the at least two authentication authorization accounting servers according to the request information.

In this embodiment, after receiving the request information sent by the access server, the at least two authentication authorization accounting servers send the respective state information of the at least two authentication authorization accounting servers to the access server. Specifically, the at least two authentication authorization accounting servers may add their respective state information into an authentication response message corresponding to the authentication request message sent by the access server, and send the authentication response message to the access server. More specifically, the at least two authentication authorization accounting servers may encapsulate their respective state information into a special attribute of the authentication response message. The sending mode of embodiments of the present disclosure is not limited herein, and the at least two authentication authorization accounting servers may send their respective state information to the access server in other modes, for example, through a special message. Embodiments of the present disclosure do not restrict how the at least two authentication authorization accounting servers send their respective state information.

The respective state information of the at least two authentication authorization accounting servers may include one or more of the following items: access respective state of the at least two authentication authorization accounting servers, number of managed access users, and remaining number of access users to be managed. The access respective state includes: normal access or abnormal access; the number of managed access users includes the number of access users managed by the authentication authorization accounting server; and remaining number of access users to be managed includes the remaining number of access users to be managed by the authentication authorization accounting server.

Step 103: Determine a load sharing ratio among the at least two authentication authorization accounting servers according to the respective state information.

Specifically, the access server may determine the load sharing ratio among at least two authentication authorization accounting servers according to one or more of the following items: the access respective state of the at least two authentication authorization accounting servers, the number of managed access users, and the remaining number of access users to be managed.

For example, if the first authentication authorization accounting server returns that the remaining number of access users to be managed is 10000, and the second authentication authorization accounting server returns that the remaining number of access users to be managed is 5000, the load sharing ratio among the first authentication authorization accounting server and the second authentication authorization accounting server may be determined as 2:1. Embodiments of the present disclosure are not limited to that, and more sophisticated scenarios may be considered. For example, the access server may determine a percentage of idle resources available for managing access users among the at least two authentication authorization accounting servers according to the number of managed access users and the remaining number of access users to be managed; and then determine the load sharing ratio among the at least two authentication authorization accounting servers according to the percentage. Embodiments of the present disclosure do not restrict how to determine the load sharing ratio among the at least two authentication authorization accounting servers, and any determining mode is appropriate if it can determine the load sharing ratio among the at least two authentication authorization accounting servers according to the respective state information.

Step 104: Share loads among the at least two authentication authorization accounting servers according to the load sharing ratio.

In this embodiment, after determining the load sharing ratio among the at least two authentication authorization accounting servers according to respective state information, the access server shares loads among the at least two authentication authorization accounting servers according to the determined load sharing ratio. Specifically, after receiving an access request from a user, the access server sends the user's authentication request message to the at least two authentication authorization accounting servers according to the determined load sharing ratio.

For example, it is assumed that the first authentication authorization accounting server and the second authentication authorization accounting server are communicative connected with the access server, and the access server determines the load sharing ratio among the first authentication authorization accounting server and the second authentication authorization accounting server as 2:1 according to the respective state information of the first authentication authorization accounting server and the respective state information of the second authentication authorization accounting server. If the access server receives access requests from three users, the access server sends the authentication request messages of two users to the first authentication authorization accounting server, and sends the authentication request message of one user to the second authentication authorization accounting server.

In this embodiment, the authentication authorization accounting server may be a RADIUS server, and the access server may be a BRAS. However, it shall not be construed as a limitation on the present disclosure. The authentication authorization accounting server may be another server capable of any of authentication function, authorization function and accounting function; and the access server may be another type of access server. The type of the access servers is not limited in the embodiment.

Understandably, the expressions "first" and "second" in the embodiments are for ease of description only, and do not represent levels of performance or priority.

In the above embodiment, the access server determines a load sharing ratio among at least two authentication authorization accounting servers according to respective state information of the at least two authentication authorization accounting servers, and shares loads among the at least two authentication authorization accounting servers according to the load sharing ratio. In this way, the access server can adjust the load sharing ratio between the authentication authorization accounting servers dynamically, which improves user access performance.

Persons of ordinary skill in the art should understand that all or part of the steps of the method specified in any embodiment of the present disclosure may be implemented by a program instructing relevant hardware. The program may be stored in a computer readable storage medium. When the program runs, the program executes the steps of the method specified in any embodiment above. The storage medium may be any medium capable of storing program codes, such as ROM, RAM, magnetic disk, or optical disk.

Figure 2:
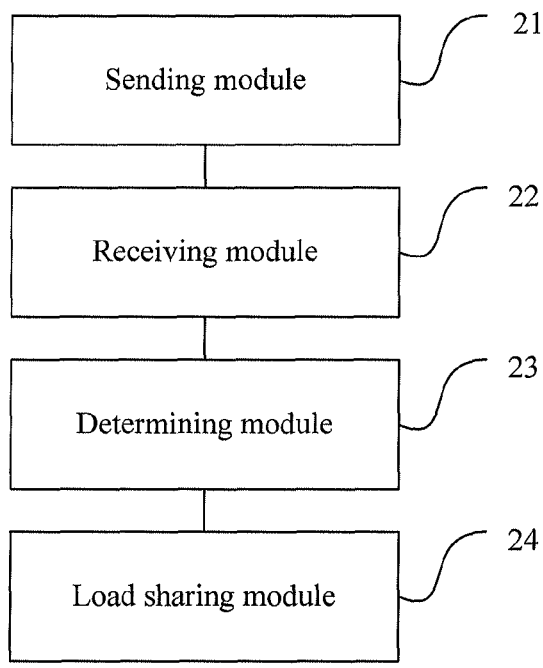
FIG. 2 is a schematic structural diagram of an access server according to an embodiment of the present disclosure.

FIG. 2 is a schematic structural diagram of an access server according to an embodiment of the present disclosure. The access server in this embodiment can implement the procedure of the embodiment shown in FIG. 1. As shown in FIG. 2, the access server may include a sending module 21, a receiving module 22, a determining module 23, and a load sharing module 24.

The sending module 21 is configured to send request information to at least two authentication authorization accounting servers. The sending module 21 may send request information to the at least two authentication authorization accounting servers through authentication request messages at fixed time, or periodically, or as triggered by an event.

The receiving module 22 is configured to receive respective state information sent by the at least two authentication authorization accounting servers according to the request information. Specifically, the receiving module 22 may receive the respective state information sent by the at least two authentication authorization accounting servers according to the request information, where the respective state information is carried in an authentication response message corresponding to the authentication request message. The respective state information may include one or more of the following items: the access respective state of the at least two authentication authorization accounting servers, the number of managed access users, and the remaining number of access users to be managed.

The determining module 23 is configured to determine the load sharing ratio among the at least two authentication authorization accounting servers according to the respective state information received by the receiving module 22. Specifically, the determining module 23 may determine the load sharing ratio among the at least two authentication authorization accounting servers according to one or more of the following items: the access respective state of the at least two authentication authorization accounting servers, the number of managed access users, and the remaining number of access users to be managed.

The load sharing module 24 is configured to share loads among the at least two authentication authorization accounting servers according to the load sharing ratio determined by the determining module 23.

In this embodiment, the authentication authorization accounting server may be a RADIUS server, and the access server may be a BRAS, which, however, shall not be construed as a limitation on the present disclosure. The authentication authorization accounting server may be another server capable of any of authentication function, authorization function and accounting function; and the access server may be other access server. The access server in embodiments of the present disclosure is not limited herein.

In the above embodiment, the determining module 23 determines the load sharing ratio among at least two authentication authorization accounting servers according to respective state information of the at least two authentication authorization accounting servers, and the load sharing module 24 shares loads among the at least two authentication authorization accounting servers according to the load sharing ratio. In this way, the access server can adjust the load sharing ratio among the authentication authorization accounting servers dynamically, which improves user access performance.

Figure 3:
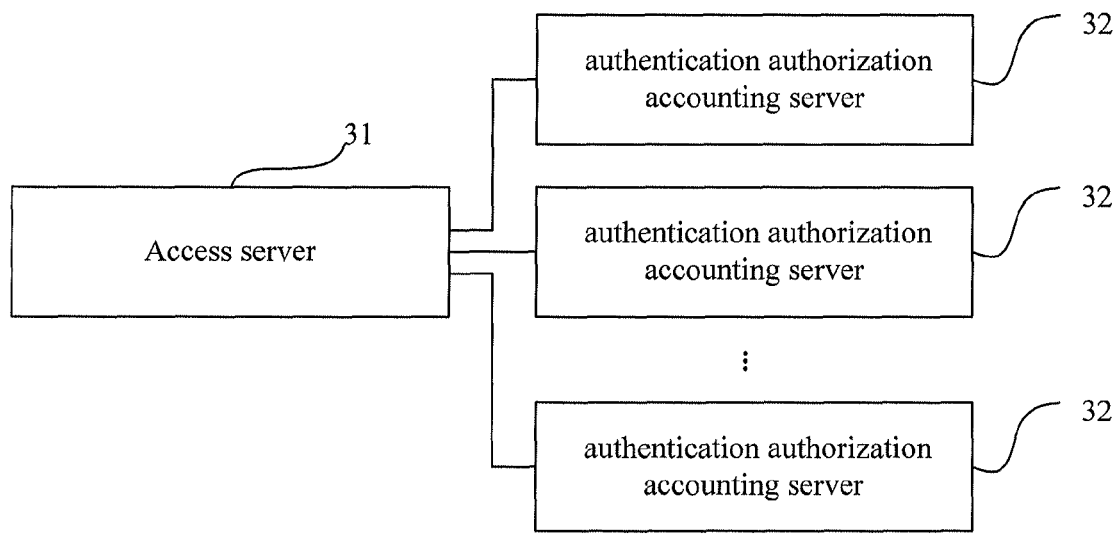
FIG. 3 is a schematic structural diagram of a load sharing system according to an embodiment of the present disclosure.

FIG. 3 is a schematic structural diagram of a load sharing system according to an embodiment of the present disclosure. As shown in FIG. 3, the load sharing system may include an access server 31 and at least two authentication authorization accounting servers 32.

The access server 31 is configured to: send request information to at least two authentication authorization accounting servers 32, receive respective state information sent by the at least two authentication authorization accounting servers 32 according to the request information, determine a load sharing ratio among the at least two authentication authorization accounting servers 32 according to the respective state information, and shares loads among the at least two authentication authorization accounting servers 32 according to the load sharing ratio. Specifically, the access server 31 may be the access server in the embodiments shown in FIG. 2.

In this embodiment, the authentication authorization accounting server 32 may be a RADIUS server, and the access server 31 may be a BRAS, which, however, shall not be construed as a limitation on the present disclosure. The authentication authorization accounting server 32 may be another server capable of any of authentication function, authorization function and accounting function; and the access server may be other access server 31. The access servers in the embodiments of the present disclosure are not limited herein.

In the above embodiment, the access server 31 determines a load sharing ratio among at least two authentication authorization accounting servers 32 according to respective state information of the at least two AAA servers 32, and shares loads among the at least two authentication authorization accounting servers 32 according to the load sharing ratio. In this way, the access server 31 can adjust the load sharing ratio among the authentication authorization accounting server 32 servers dynamically, which improves user access performance.

Those skilled in the art should understand that the accompanying drawings are only schematic diagrams of preferred embodiments, and the modules or procedures illustrated in the accompanying drawings are not mandatory for implementing the present disclosure.

Those skilled in the art should understand that the modules in an apparatus provided in embodiments of the present disclosure may be distributed in the apparatus in the way described herein, or may be located in one or more apparatuses in a different way. The modules may be combined into one, or split into plurality of sub-modules.

Finally, it should be noted that the above embodiments are merely provided for describing the technical solutions of the present disclosure, but not intended to limit the present disclosure. Although the present disclosure is described in detail with reference to the foregoing embodiments, it is understandable that persons of ordinary skill in the art may still make modifications to the technical solutions of the foregoing embodiments or make equivalent replacements to part of the technical characteristics thereof without departing from the spirit and scope of the disclosure. All these modifications and replacements shall fall within the protection scope defined by the following claims or their equivalents.

What is claimed is:

1. A load sharing method, comprising:
   sending, by an access server, request information to at least two authentication authorization accounting (AAA) servers at fixed time or periodically;
   receiving, by the access server, respective state information sent by the at least two authentication authorization accounting servers according to the request information;
   determining, by the access server, a load sharing ratio among the at least two authentication authorization accounting servers according to the respective state information; and
   sending, by the access server, a user's authentication request message to the at least two AAA servers according to the load sharing ratio after receiving an access request from the user.

2. The method according to claim 1, wherein the sending of the request information to the at least two authentication authorization accounting servers at fixed time or periodically comprising:
   sending the request information to the at least two authentication authorization accounting servers through authentication request messages at fixed time, or periodically.

3. The method according to claim 2, wherein the receiving of the respective state information sent by the at least two authentication authorization accounting servers according to the request information comprising:
   receiving the respective state information sent by the at least two authentication authorization accounting servers according to the request information, wherein the respective state information is carried in an authentication response message corresponding to the authentication request message, and the respective state information comprises one or more of the following items: access respective state of the at least two authentication authorization accounting servers, number of managed access users, and remaining number of access users to be managed.

4. The method according to claim 3, wherein the determining of the load sharing ratio among the at least two authentication authorization accounting servers according to the respective state information comprising:
   determining the load sharing ratio among the at least two authentication authorization accounting servers according to one or more of the following items: the access respective state of the at least two authentication authorization accounting servers, the number of managed access users, and the remaining number of access users to be managed.

5. An access server, comprising:
   a sending module, configured to send request information to at least two authentication authorization accounting servers at fixed time or periodically;
   a receiving module, configured to receive respective state information sent by the at least two authentication authorization accounting servers according to the request information;
   a determining module, configured to determine a load sharing ratio among the at least two authentication authorization accounting servers according to the respective state information received by the receiving module; and
   a load sharing module, configured to send a user's authentication request message to the at least two authentication authorization accounting servers according to the load sharing ratio determined by the determining module after receiving an access request from the user.

6. The access server according to claim 5, wherein the sending module is specifically configured to send the request information to the at least two authentication authorization accounting servers through authentication request messages at fixed time, or periodically.

7. The access server according to claim 6, wherein the receiving module is specifically configured to receive the respective state information sent by the at least two authentication authorization accounting servers according to the request information, wherein the respective state information is carried in an authentication response message corresponding to the authentication request message, and the respective state information comprises one or more of: access respective state of the at least two authentication authorization accounting servers, number of managed access users, and remaining number of access users to be managed.

8. The access server according to claim 7, wherein the determining module is specifically configured to determine the load sharing ratio among the at least two authentication authorization accounting servers according to one or more of: the access respective state of the at least two authentication authorization accounting servers, the number of managed access users, and the remaining number of access users to be managed.

9. A load sharing system, comprising an access server and at least two authentication authorization accounting servers, wherein:

the access server is configured to:
send request information to at least two authentication authorization accounting servers at fixed time or periodically, receive respective state information sent by the at least two authentication authorization accounting servers according to the request information,
determine a load sharing ratio among the at least two authentication authorization accounting servers according to the respective state information; and
send a user's authentication request message to the at least two authentication authorization accounting servers according to the load sharing ratio after receiving an access request from the user.

* * * * *